United States Patent [19]

Nicholson

[11] 4,184,751
[45] Jan. 22, 1980

[54] PHTHALOCYANINE ELECTROCHROMIC DISPLAY

[75] Inventor: Margie M. Nicholson, San Marino, Calif.

[73] Assignee: Rockwell International Corporation, El Segundo, Calif.

[21] Appl. No.: 948,364

[22] Filed: Oct. 4, 1978

Related U.S. Application Data

[63] Continuation of Ser. No. 752,950, Dec. 20, 1976, abandoned.

[51] Int. Cl.² .................................................. G02F 1/17
[52] U.S. Cl. ................................................... 350/357
[58] Field of Search ........................... 350/357; 252/408

[56] References Cited

U.S. PATENT DOCUMENTS

| | | | |
|---|---|---|---|
| 3,912,368 | 10/1975 | Ponjee et al. | 350/357 |
| 4,006,585 | 2/1977 | Tamaru et al. | 350/357 |
| 4,021,100 | 5/1977 | Giglia | 350/357 |

*Primary Examiner*—James W. Davie
*Attorney, Agent, or Firm*—H. Fredrick Hamann; Daniel R. McGlynn

[57] ABSTRACT

An electrochromic display utilizing a metal diphthalocyanine complex as the electrochromic material is disclosed. Displayed information can be switched in less than 100 milliseconds. The display has multicolor and color reversal capabilities.

13 Claims, 7 Drawing Figures

PHTHALOCYANINE ELECTROCHROMIC DISPLAY

This continuation of application Ser. No. 752,950 filed Dec. 20, 1976, now abandoned.

BACKGROUND OF THE INVENTION

1. Field of the Invention

The invention relates to the field of electrically controllable displays and more particularly to the field of electrochromic displays.

2. Background of the Invention

There are many uses for electrically controllable display devices. A number of such devices have been in commercial use for some time. These display devices include liquid crystal displays, light emitting diode displays, plasma displays and so on. Light emitting diode and plasma display panels both suffer from the fact that they are active, light emissive devices which require substantial power for their operation. In addition, it is difficult, if not impossible, to fabricate light emitting diode displays in a manner which renders them easily distinguishable under bright ambient illumination. Liquid crystal displays suffer from the disadvantage that they are operative only over a limited temperature range and have substantially no memory within the liquid crystal material. Further, the visibility of many liquid crystal displays decreases as the viewer moves a few degrees off axis.

Electrochromic displays have been developed which display information through a change in the color of portions in the display via electrodeposition of an active material to achieve a color change. Generally, this color change is from white to a color such as blue. Because of their electrodeposition mechanism, such displays require substantial power and time to write or erase displayed information. The quantities of power required are undesirably large, especially for battery operation, and the time required to change displayed information makes such materials unacceptable for many display applications. None of these displays display more than a single color against a background. This limits the versatility of such displays since the color of a character cannot be used to convey information.

Rare earth diphthalocyanines are known from prior publications to have electrochromic properties in which the color of the diphthalocyanine can change over a period of about eight seconds upon application of a potential difference across an electrochemical cell having a diphthalocyanine film on one of the electrodes. P. N. Moskalev and I. S. Kirin, "Effect of the Electrode Potential on the Absorption Spectrum of a Rare-Earth Diphthalocyanine Layer," *Opt. i Spektrosk*, 29, 414 (1970) and P. N. Moskalev and I. S. Kirin, "The Electrochromism of Lanthanide Diphthalocyanines" *Russian J. Phys. Chem.*, 46, 1019 (1972). The diphthalocyanine does not require large amounts of power to change color, but the long period required for the color to change makes known diphthalocyanine performance characteristics unacceptable when measured against display requirements.

Consequently, a display device is needed which can be rapidly switched, produces several colors, retains its memory with the power turned off, can be easily read under a wide range of ambient light conditions and viewing angles an does not require large quantities of power for its operation.

SUMMARY OF THE INVENTION

The display of the instant invention overcomes many of the problems of prior art displays via utilization of metal diphthalocyanine complexes as the electrochromically active material in an electrochromic display cell. Rapid color changes in less than 50 milliseconds are achieved, thus alleviating the slow switching time previously reported for rare earth diphthalocyanine complexes. Power requirements are small because of the low power switching characteristics of the display material and because the display exhibits an open circuit memory of from several minutes to several hours, depending on its construction. A multi-color, i.e. more than two color, display is achieved through use of a range of voltages applied between display and counter electrodes. Color reversal of displayed information and the background against which it is displayed is achieved through use of display electrodes in the background portions of the viewing area as well as in the character segments. Both the multicolor and the color reversal capabilities increase the information conveyance capability of the display over that of conventional display devices.

DETAILED DESCRIPTION OF PREFERRED EMBODIMENTS

Figure 1:
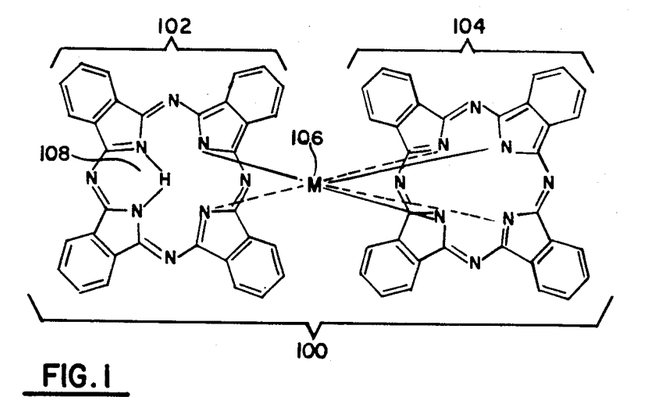
FIG. 1 illustrates the probable structure of a metal-diphthalocyanine-complex molecule.

The probable structure of metal diphthalocyanine complexes is illustrated generally at 100 in FIG. 1. This molecule comprises two phthalocyanine ring structures 102 and 104 which are believed to lie in substantially parallel planes with a metal ion 106 (M) disposed between the planes occupied by the phthalocyanine rings. In the preferred embodiment of the invention, the metal in the complex is preferably yttrium, scandium, or a rare earth of the lanthanide series. However, other metals whose diphthalocyanine complexes are electrochromic may be utilized.

The bonds from each phthalocyanine ring to the rare earth ion are believed to be what bonds the structure together as a molecule. The detailed internal mechanism which renders a metal-diphthalocyanine complex electrochromic is not yet understood, although the existence of the effect is well established and is believed to involve the hydrogen indicated by the reference numeral 108. Metal diphthalocyanine complexes for utilization in this invention may be synthesized by methods which have been described in the literature. It is preferred to purify the metal-diphthalocyanine complexes by vacuum sublimation in order to obtain high purity films of the diphthalocyanine complexes in display cells. The diphthalocyanine film of a display cell is preferably deposited by vacuum sublimation of a diphthalocyanine at pressures on the order of $10^{-6}$ mm to $10^{-5}$ mm of mercury. During sublimation of the diphthalocyanine the source of the diphthalocyanine is held at a temperature which provides a reasonable deposition rate without destroying the complex. This temperature may preferably be in the range from about 300° C. to 400° C.

Display cells in accordance with the invention may be divided into two general groups. The first group comprises those cells which are designed to be viewed by reflected light only. For simplicity, these cells may be referred to as reflective display cells. The second group comprises those cells which are designed to be viewed by transmitted light. For simplicity, these cells may be referred to as transmissive display cells. However, the characteristics of transmissive display cells in accordance with the invention are such that information displayed by many transmissive cells is readily distinguished by reflected illumination when no source of transmitted illumination is active or in the presence of high intensity ambient illumination. A preferred reflective display cell constructed in accordance with the invention is illustrated generally at 10 in FIG. 2. Display cell 10 has a case 12 which supports a transparent faceplate 14 which constitutes the viewing surface or area of the display cell. Case 12 and faceplate 14 together form a preferably sealed chamber 16 within which the electrochromic material, the cell electrodes and an electrolyte are contained. A plurality of transparent display electrodes are preferably deposited on the inner surface of the faceplate 14. The display electrodes include character segments 20, the number and the arrangement of which is determined in accordance with the quantity and types of information the cell is intended to be able to display, as is well known in the art. The display electrodes also preferably include background segments 26, the purpose of which will be explained hereinafter. A thin layer 30 of an electrochromic metal diphthalocyanine is disposed on the display electrodes, both character segments 20 and background segments 26, for exposure to the electrolyte 18. The metal diphthalocyanine film 30 comprises the electrochromic material of the dislay cell. A counter electrode 22 is preferably disposed on a portion of the case 12 which constitutes the back surface of the cavity 16, as is a separate reference electrode 24.

Figure 2:
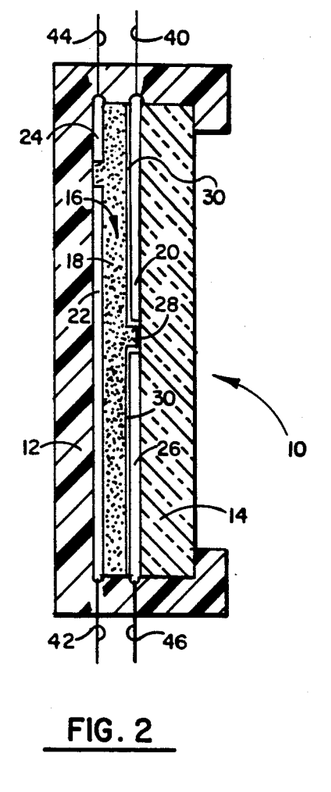
FIGS. 2–5 are illustrations of cross-sections through various configurations of display cells in accordance with the invention.

In a display which is viewed by reflected light, electrolyte 18 is preferably a system comprising an inert white porous solid such as calcium sulfate dihydrate plaster ($CaSO_4.2H_2O$) (commonly known as plaster of Paris) saturated with an inert electrolyte such as an aqeuous solution of potassium chloride (KCl). A white plaster is preferred in order that the plaster will not adversely affect the colors generated by the electrochromic film and will provide a non-specular background which will enhance the uniformity of the display over a wide range of viewing angles. In order to obtain an efficient, aesthetically pleasing cell, it is preferred that the electrolyte system 18 completely fill the portion of the chamber 16 which is not occupied by the electrodes and the electrochromic film 30. To this end, it is considered preferable to complete assembly of the cell to the point where the case, faceplate, electrodes and electrochromic film are present in their final positions and then fill the cavity 16 with a water slurry of partially dehydrated calcium sulfate. The plaster is then allowed to harden (set). After the plaster has set and dried sufficiently, the potassium chloride solution is introduced into the cavity to fill the pores of the plaster and to form a thin layer between the plaster and the electrochromic film via capillary action. In order to provide a cell having good operating characteristics and a long useful life, it is preferred to completely saturate the plaster with the electrolyte solution thereby assuring substantially uniform electrolyte characteristics throughout the cell and minimizing the possibility of trapping gases within the cell.

When a potassium chloride electrolyte is utilized, reference electrode may preferably be made of silver, lead or mercury and may be coated with the chloride thereof. However, many other materials may be utilized as the reference electrode, and the chloride coating is not essential, but will tend to form within the cell.

Figure 7:
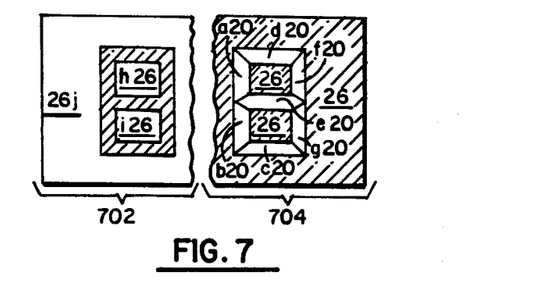
FIG. 7 illustrates the color reversal aspect of this invention.

In many displays, because of the types of information which they are intended to display, such as numerical data, there are substantial areas of the display which are dedicated as background areas against which information contained images are displayed. In addition to these dedicated background areas, there are selectively activatable character segments which may be activated to form information conveying images such as letters, numerals and punctuation symbols. It is generally considered desirable to have these selectively activatable segments merge visually into the dedicated background areas except when activated in order to obtain a display having maximum aesthetic appeal and informational clarity. For clarity in the following discussion, the areas of a display which are dedicated as background areas will be referred to as background segments and those segments which are selectively activatable to form information-conveying images will be referred to as character segments. Character segments and background segments of a seven segment numerical display are illustrated in FIG. 7. In FIG. 7, the individual character segments 20 in portion 704 have been lettered a through g and background segments 26 in portion 702 have been lettered h, i and j. The specific number and arrangement of character segments and background segments is a matter of choice to be selected in accordance with the information intended to be exhibited by the display.

When no information is being displayed, the entire display area, both background segments and character segments, should exhibit a single, uniform color. Consequently, it is desirable that the background segments of the display exhibit the display-off color of the character segments as a background into which unactivated character segments will merge and against which activated character segments will contrast and stand out. It is theoretically possible to provide a background color which exactly matches the display off color of the character segments by applying a corresponding pigment to the background areas of the display faceplate. However, it is difficult, if not impossible, to achieve a perfect color match under all lighting conditions for all viewing angles for the life of the display. If the color match is not perfect under all lighting conditions, then the character segments which are not activated may become visible in the off condition, thereby creating an aesthetically displeasing effect and possibly rendering the display confusing.

The invention avoids the problem of pigment matching by providing background display electrode segments 26 on the faceplate 14 everywhere except where individual character electrode segments 20 are located and except for a narrow electrodeless region 28 surrounding each display electrode. The electrodeless regions 28 prevent shorting of individual display electrodes to each other.

In accordance with the invention, the presence of background display electrode segments allows the color of the background area to be electrically controlled to match the display off color of character segments. Additionally benefits are obtained by making the potential of the background segments externally selectable in order that the background color may be changed, and the color of the "on" character segments chosen to contrast therewith. In a multicolor display, existence of a substantial number of background-color/active-character-segment-color combinations are possible. The possible combinations include reversal (exchange) of background color with active character segment color. Similarly, in a two-color display such as one in which character segments can be made either of two colors, the background color and the active character segment color may be reversed (exchanged). Thus, in a two-color display such as one in which character segments may be made either red or green, the information may be displayed in red characters on a green background or green characters on a red background. Accordingly, in accordance with the use to which the display is put, a two-color display may be utilized in a red-on-green mode under normal conditions and a green-on-red mode under emergency conditions, high priority conditions, or other selected conditions in order to attract the attention of an operator or other observer. Similarly, in a calculator, thermometer, or other device which can display both positive and negative numbers, negative numbers can be indicated by reversal of display colors in a two-color display.

The color reversal technique of this invention is illustrated in FIG. 7 in which two seven-segment numerical character displays are illustrated. In the lefthand portion 702, of FIG. 7, the character 8 is illustrated in a first color, such as red, against a background formed of a second color, such as green. In the righthand portion, 704, of FIG. 7, the character 8 is displayed in a color reversed manner such as green against a red background. It will be understood, that since the drawings in this patent are in black and white and only shaded for color, the full impact of the color reversal cannot be presented in the drawings since characters displayed in red on green and green on red are instantaneously apparent to a non-colorblind observer whereas, in black and white drawings, the character is not as instantaneously distinguishable. In order for the color reversal technique to be most effective, each displayed character must be surrounded by controllable background area in order to provide a true color reversal, that is, from green on red to red on green in order to maximize the instantaneous impact of the displayed character of a human observer.

A similar technique may be utilized in multi-color displays, or selected color(s) may be reserved for utilization to indicate specific conditions such as negative numbers, emergency or high priority situations and so forth in order to attract the attention of an operator or observer.

The ability to reverse display colors and/or provide a multicolor display increases the information which can be conveyed by the display over what these same characters would be able to convey in a prior art display since the color of the display can convey information which would otherwise require the presence of additional characters.

Referring once again to display 10 of FIG. 2, character segments 20, counter electrode 22, reference electrode 24 and background segments 26 are each provided with an external lead 40, 42, 44 and 46 respectively, for connecting each electrode to external drive circuitry. If desired, where there is more than one background segment, the background segments may have either individual external leads or a common external lead.

All display electrodes, both character segments 20 and background segment 26 are preferably formed simultaneously by deposition of a single continuous film of transparent conductive material. The segments 20 and 26 are then defined by removal of the conductive material to form the insulating regions 28 which separate the individual display electrodes from each other. The electrochromic layers 30 are also preferably formed as a single film. This technique for forming the electrodes and the film causes the electrodes and the films to have substantially identical electrical and optical characteristics which make it possible for background segments and character segments to merge visually when both are in the same optical state. What optical state a display electrode and its associated electrochromic film are in is controlled by the potential applied to the display electrode. Thus, when a background electrode segment 26 is held at the same potential as a character electrode segment 20 of a non-selected or "off" character segment, the non-selected character segments are essentially indistinguishable from the background segments. When a contrast inducing voltage is applied to selected or "on" character segments, the selected character segments contrast with this common background whereby the selected character segments are clearly visible to an observer, so long as there is sufficient illumination to render the display area visible.

Figure 3:
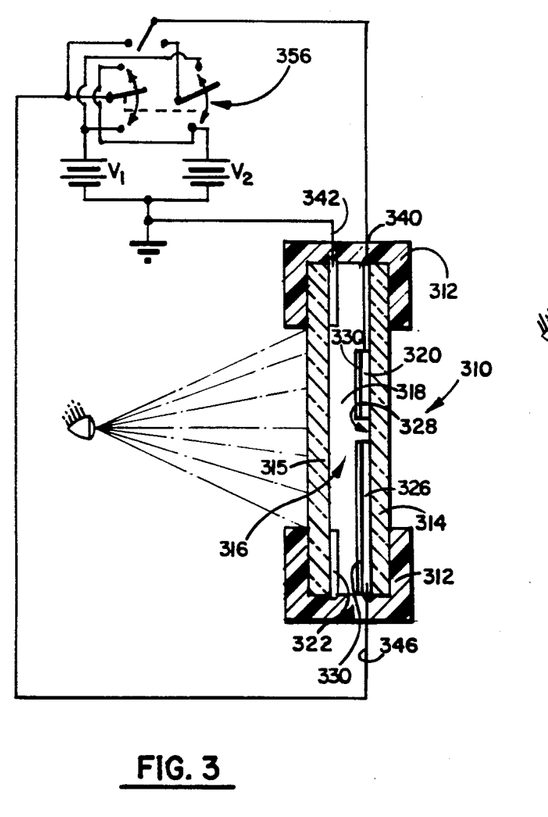

The electrochromic film may be a single continuous film which is deposited after delineation of the individual display electrodes and which is disposed in the electrodeless regions 28 as well as on the electrodes, as is illustrated in FIG. 2. Alternatively, the electrochromic film may be separated into separate segments by leaving regions 28 without an electrochromic film, as illustrated in FIG. 3 (to be discussed later). If the electrochromic film covers regions 28, it will tend to retain its original color in these regions, even when one or both of the adjacent electrodes is under an applied signal which induces a different color. The visual distraction caused by the unactivatable border regions 28 will be minimized if the background segments 26 are maintained at a color close to that of the original electrochromic film during the operation of the display, or if there is no electrochromic film in the regions 28 as illustrated in FIG. 3.

The diphthalocyanine film thickness should be in the range of about 0.2 to 1.0 micron, depending on the intensity of color desired. To increase the useful life of the display, a transparent porous binder such as cellulose nitrate or a polycarbonate resin may be incorporated into the diphthalocyanine film after it is vacuum deposited. The binder may be applied by contacting the vacuum deposited film with a solution of the binder in an organic solvent such as methyl isolbutyl ketone, which does not dissolve the diphthalocyanine rapidly enough to be a problem.

The transparent conductive material of which the electrodes are formed may be stoichiometric, non-stoichiometric or doped tin oxide, a composite of indium oxide and tin oxide or any other material of similar optical transparency and electrical conductivity which is stable in the electrolyte.

The switching time required to change the color of the display is controlled by the apparent RC time constant of the overall structure comprising the display electrode(s) being switched, the electrochromic film thereon, the electrolyte system, the counter electrode and the leads from the counter electrode and display electrode(s) to the external control circuit. This structure displays an apparent capacitance and an apparent resistance which control the switching time. Because the counter electrode and the lead from it to the external circuitry can be outside the viewable area of the display, their conductivity can be made very high by using metallic conductors without adversely affecting the visual characteristics of the display. Consequently, in a properly designed cell, the counter electrode and its lead to the external circuitry will be sufficiently conductive that they contribute almost nothing to the apparent resistance of the cell structure. If transparent electrodes are positioned where viewing light must pass through them, the transparent electrodes will generally be the dominant factor in the apparent resistance of the cell structure. Transparent leads which are within the viewable area of the display and which lead from the external circuitry to the display electrode segments will often be the limiting portion of the transparent electrode resistance. In order to obtain a switching time of less than 50 milliseconds with a display area on the order of 5 cm$^2$, the sheet resistance of the transparent conductor should be less than about 15 ohms per square and the resistance of the transparent leads should be less than about 30 ohms. A switching time of less than about 200 milliseconds is considered desirable in order that the color change will appear instantaneous to a human observer. Switching times of this order can be obtained even with RC time constants as long as one second.

A preferred transmissive display cell which is constructed in accordance with the invention is illustrated generally at 310 in FIG. 3. Display cell 310 has a case 312 which supports a transparent faceplate 314 and a light transmissive backplate 315 which is in optical alignment with faceplate 314. Case 312, transparent faceplate 314 and transmissive backplate 315 together form a preferably sealed chamber 316 in which the electrochromic material, the cell electrodes and an electrolyte 318 are contained. Transparent display electrode character segments 320 and background segments 326 are preferably disposed on the inner surface of faceplate 314. Individual display electrode segments are isolated from other display electrode segments by narrow electrodeless regions 328. Electrochromic film 330 is disposed over the display electrodes on the side thereof facing the electrolyte 318. Backplate 315 is in optical alignment with faceplate 314 if light which enters the cell through backplate 315 backlights the display electrodes whereby the display can be made clearly visible by transmitted light even if the absence of sufficient ambient illumination to make the display easily intelligible by reflected light.

One of the character segment or background colors can be achieved without application of external electrical power if a combined reference/counter electrode 322 is utilized rather than separate counter and reference electrodes (as in cell 10 of FIG. 2) and if the reference/counter electrode is formed of a material which has a stable electrochemical potential in the electrolyte 318 which causes the selected color to be produced when a display electrode segment is shorted to the reference/counter electrode. Because of the memory characteristics of the display cell, it is usually unnecessary to apply a drive voltage (or short circuit) longer than momentarily in order to achieve a remanant color change. Consequently, in order to minimize power drain and possibly extend the life of the display, it is considered preferable to maintain a steady display by periodically momentarily applying the drive potentials, the period between application of drive potentials being such that the color of the display does not change detectably between drive applications.

Counter electrodes 322 is preferably disposed on the inner surface of backplate 315 outside the viewable display area. Alternatively, in accordance with the construction of this cell, the counter electrode may be disposed on a portion of the case 312 or on a portion of the faceplate 314. Backplate 315 may be transparent if the display is backlighted by a diffused light source. Such a diffused light source may be one which is inherently diffuse or one which is inherently non-diffuse but which has been rendered diffuse by placing an appropriate translucent material between the light source and the display cell. Where the display cell is used with a non-diffuse light source, then backplate 315 is preferably made translucent in order to render the display illumination diffuse. It will be understood that a display cell having a translucent backplate 315 may also be used with a diffuse light source.

In a display cell in the configuration of cell 310 in FIG. 3, a translucent electrolyte such as a gel saturated with an aqueous potassium chloride solution may be utilized to provide diffuse lighting of the display areas, thus minimizing the need for other diffusers. If a translucent electrolyte is utilized, then backplate 315 is preferably transparent in order to maximize the transmission efficiency of the display cell. However, if transmission efficiency of the cell is not a problem, then backplate 315 may be translucent even when a translucent electrolyte is utilized.

The reference/counter electrode 322 may be comprised of any sufficiently conductive material which will establish a stable electrochemical potential in contact with the electrolyte 318 to provide a defined reference level in the display cell and which will maintain this stable potential with only minor deviations during the passage through the cell of the current that is required to establish the color of the display. In addition, as mentioned previously, it is preferred that the reference/counter electrode have an electrochemical potential in the electrolyte which will cause one of the desired display colors to be exhibited by an electrochromic-film-coated electrode which is shorted to the reference electrode. Under such conditions, no externally supplied electric power is required to maintain the display in the state (color) associated with the shorted condition of the electrode. In many applications, the background segments and character segments which are off will have a substantially larger cumulative area than the cumulative area of the character segments which are on. Consequently, if it is important to minimize the power consumed by the display, it is preferred that the electrode-shorted color be the background color, since this will minimize the power consumed by the display. Where power consumption is not an important consideration, aesthetics or convention may dictate a different choice of background color (voltage). In some circumstances, even where power consumption is important, aesthetics, visual requirements or convention may make selection of a minimum power configuration impractical.

As has been discussed, display cells 10 and 310 of FIGS. 2 and 3, respectively, embody a number of desirable features. Among these are a background which is coplanar with the display, consists of the same electrochromic material and whose color is electrically controllable. The electrical control of both background segment and character segment color provides exact color matching in the erased condition. The coplanar arrangement minimizes any change in appearance with the display viewing angle which can occur as a result of parallax in displays where the background area and character segment areas are in different planes. Additionally, the white plaster electrolyte system 18 of cell 10 provides a uniform background against which both display and background colors are viewed. The white nature of this plaster enhances viewing characteristics of the display colors. Further, these display cells in accordance with the invention are operable over a wide temperature range without apparent adverse effects on the visual characteristics of the display. Display cells in accordance with this invention have been operated over the temperature range 5° C. to 65° C. without any apparent change in operating characteristics. The limits of the operating temperature range are currently believed to be the freezing point of the electrolyte and the temperature at which the vapor pressure of the electrolyte becomes excessive. The excellent operating characteristics at low temperature are believed to result from the fact that the display cell of the invention does not require diffusion of large quantities of materials as in prior art electrodeposition electrochromic display systems.

The use of a combined reference/counter electrode as in cell 310 simplifies cell construction and drive circuitry. Further, use of a lead (Pb) plate as the combined reference/counter electrode when the electrochromic film is a lutetium diphthalocyanine can reduce the power requirements of the display, since the lead (Pb) electrode potential in a $CaSO_4$-KCl environment yields a bright green color when a lutetium diphthalocyanine coated display electrode is shorted to a lead reference/counter electrode. Such shorting may preferably be occasional as is required to refresh the color. The bright green color of lutetium diphthalocyanine can be maintained by refreshing once every twenty four hours or even more infrequently. Consequently, the shorted electrode condition is selected as the background state when minimum power consumption is important. In consequence, external power is required only to write the display, and not to erase it or maintain it in the background color (other than to switch the connection of the electrode initially and for subsequent refreshment). The power consumption of these display cells can be further reduced by using a thinner electrolyte layer, a higher electrolyte concentration and a more conductive transparent electrode.

Figure 4:
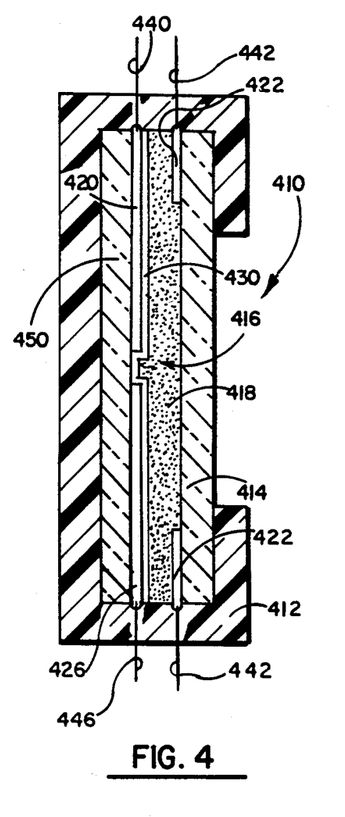

An alternative reflective embodiment of a display cell in accordance with the invention is illustrated generally at 410 in FIG. 4. Cell 410 has many similarities to cell 10 of FIG. 2. Display cell 410 has a case 412 and a face plate 414 which together define a cavity 416 within which the cell electrodes, the electrochromic material and the electrolyte are disposed. Display electrodes (character segments 420 and background segments 426) are disposed on the back surface of the cavity 416. If the material of case 412 is appropriate, the case 412 may form the back of a cavity and the electrodes may be disposed thereon. However, if the material of the case 412 is not appropriate for providing a non-specular uniform display, a layer of appropriate material 450 such as white glass may be placed in contact with the inner back surface of the case 412 to form the back of cavity 416. Under these circumstances, the character and background segments 420 and 426 respectively, are disposed on the white glass 450. A counter/reference electrode 422 is disposed within cavity 416, preferably outside the viewing area of the display. Counter/reference electrode 422 is illustrated as being disposed on the inner surface of face plate 414, alternatively may be placed in contact with the back surface of cavity 416 or in contact with a portion of the case 412 which forms a boundary of the cavity.

A layer 430 of diphthalocyanine material is disposed on the surfaces of the display electrodes (both character segments 420 and background segments 426) which are exposed in cavity 416 and form a portion of the viewable area of the display. The portion of cavity 416 which is not occupied by the electrodes, the electrochromatic material or the white background material 450 is filled by an electrolyte 418. External leads 440, 442 and 446 are provided for character segments 420, counter/reference electrode 422 and background segments 426, respectively. In this embodiment, the electrolyte 418 is preferably transparent in order to provide clearly defined edges of the various display segments and an adequate degree of overall reflectivity for the cell. If the electrolyte were not transparent, the reflectivity of the cell would be reduced and/or the edges of character segments would not be clearly delineated to a viewer because of a diffuseness of the image which would result from utilization of a translucent electrolyte.

Reflective display cell 410 is similar to reflective display cell 10 in many respects, but has been modified to have the display electrodes (character segments and background segments) therein disposed on a different surface of the display cell cavity. Transmissive display cell 310 may be modified in a similar manner. In such a modified transmissive cell, it is preferred to utilize transparent electrolyte for the reasons discussed above with respect to cell 410.

Figure 5:
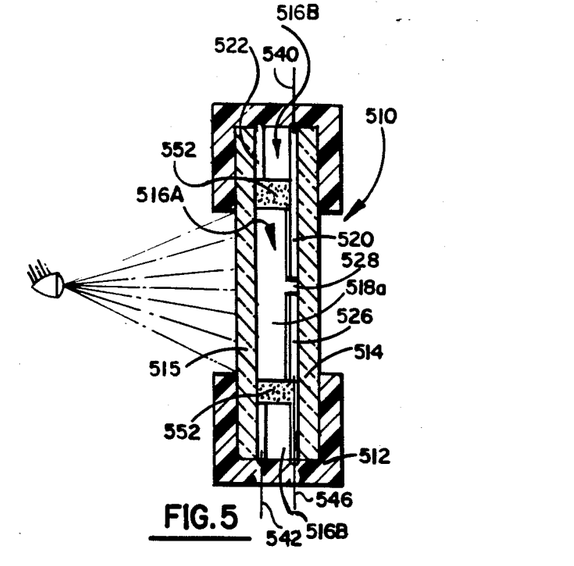

In the display cells illustrated in FIGS. 2-4, all of the components located within the cavity of the display cell must be chemically compatible. This can prevent the use of materials which may otherwise be desirable for use in the display cell. Where it is desired to utilize a material which is incompatible with another material, the problem of incompatibility can be alleviated through use of ion selective barrier or a diffusion barrier within the display cell. A display cell for viewing by transmitted light is illustrated in FIG. 5 with an ion selective or diffusion barrier isolating chemically incompatible materials. The components of this cell are for the most part similar to those of cell 310 of FIG. 3. Similar reference numerals are utilized with the exception that they are in the 500s rather than in the 300s, as in FIG. 3. The porous ion selective or diffusion barrier is indicated by the reference numeral 552. This barrier is disposed outside the viewing area and divides the cavity 516 of the display cell into at least two sub-cavities 516A and 516B. Cavity 516A comprises the display field of view and incorporates the display electrodes (both character and background segments) a portion of the cell electrolyte and the display electrochomic film.

The cavity 516B may preferably be concentric with cavity 516A and contains the counter/reference electrode 522, which for the purpose of this figure is presumed to have a deleterious effect on the electrolyte, the display electrodes or the diphthalocyanine electrochromic film located within the cavity 516A. Through use of an ion selective or diffusion barrier which prevents the transport into cavity 516A, of deleterious chemical species which may be present within cavity 516B, the construction of cell 510 prevents contamination to the viewing area of the display by the incompatible materials contained in the side cavity 516B.

A porous ion selective barrier 552 may be a material such as ion exchange resin. An ion exchange resin does not interfere with the propagation of electric current through the cell, but prevents any objectionable material which might dissolve into the electrolyte 518B of cavity 516B from the counterelectrode 522 from passing through the barrier 552 and into electrolyte 518A and thus coming in contact with a material in cavity 516A with which it is (or may be) incompatible.

A diffusion barrier serves a similar purpose by interposing a long or tortuous diffusion path between the compartments that it separates. A diffusion barrier might be a polypropylene felt material or a microporous cellophane film. The felt or microporous film retards diffusion but does not have the chemical specificity of an ion exchange barrier.

In the event that it is preferred to divide the cavity into a front half and a back half such that the barrier 552 is disposed in a field of view, then the characteristics of the barrier material must be compatible with being disposed in a field of view. For a cell which is to be viewed by transmitted light, this means that the barrier should be transparent or translucent and preferably colorless. Similarly, if the display cell is to be viewed by reflected light, it is preferred that the barrier material be white or have a uniform color in order to provide a good background for viewing the display or be suitable for use in a transmissive cell and have a white background behind it.

It will be understood that although FIG. 5 has been discussed in terms of the counter/reference electrode being incompatible with the diphthalocyanine or its electrolyte, the technique would apply equally to a separate reference electrode or separate counter electrode which was incompatible or to any other component of the system which is incompatible with a different component of the system from which it can be separated by such a barrier without adversely affecting the system.

The circuitry necessary to control the display cell depends on the display cell configuration. Where a combined counter/reference electrode is utilized, the display control is relatively simple. Two separate voltages are provided for driving the display and both are referenced to the counter/reference electrode (see FIG. 3). The first one of the voltages ($V_1$) is selected to provide the background color when a background electrode is connected to it. The second voltage ($V_2$) is chosen so that when a character segment is connected to it, the desired selected character segment color is generated. In this configuration, the background electrode segments and any character electrode segments which are not selected are connected to voltage supply $V_1$ and any character segments which are selected or "on" are connected to the voltage supply $V_2$. The color of selected character segments and background and nonselected character segments may be reversed (exchanged) by reversing the double pole, double throw color reversed switch 356 which changes the connection of the batteries to the respective electrodes.

Figure 6:
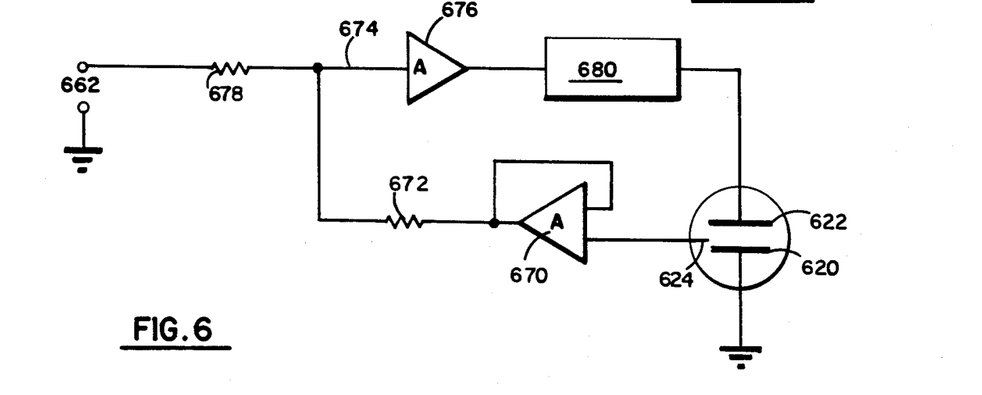
FIG. 6 illustrates one type of color control circuit.

It will be understood that if a counter electrode material is selected which results in the generation of a desired color (either the background color or the display "on" color) when an electrode is shorted to the counter electrode, then the corresponding voltage $V_1$ or $V_2$ may simply be a short circuit whereby the display requires only a single voltage source to control the color display. As indicated previously, it is preferred to apply the voltages $V_1$ and $V_2$ to the appropriate electrodes periodically on a momentary basis rather than continuously. Where the display cells incorporate separate counter and reference electrodes, as illustrated in FIG. 2, a more complicated control circuit is needed in order to provide the proper control of the display. One of the many electrical circuits which can accomplish this is illustrated in FIG. 6. In this circuit, the voltage between the reference electrode 624 and display electrode 620 is controlled to be equal to a control voltage applied to input terminals 662. The current which controls the state of the diphthalocyanine electrochromic material flows through the cell between the display electrode 620 and counter electrode 622. A voltage applied between the reference electrode 624 and the display electrode 620 is sensed by a high impedance voltage follower 670 which is connected through a resistor 672 to an input terminal 674 of an operational amplifier 676. A resistor 678 connects input terminals 662 to the same input terminal of the amplifier 676. A power amplifier 680 amplifies the output of amplifier 676 that drives the display cell. It will be understood, that in the event that the amplifier 676 is capable of providing sufficient output power and signal swing to drive the entire display cell, then power amplifier 680 may be omitted. The state of the electrochromic display material in this embodiment may be switched by changing the voltage applied to the input control terminal 662. This cell control circuit is particularly useful in those display cells which are capable of providing a plurality of different colors in response to the application of different voltages. With such display cells, the color of the display can be changed by changing the control voltage applied to the input terminal 662. Where it is not desired to change the color of the "on" character segments, but rather it is desired to change which character segments are "on", switches may be provided for switching individual character segments from the output of the amplifier 680 to the output of a similar amplifier or to a fixed source which provides the potential to control the display off or background color. In multicolor display cells where it is desired to exhibit more than two colors at one time, it may be preferable to have a separate control circuit for each color and connect the display segments to the output of the control circuit which will induce the desired color.

EXAMPLE

An electrochromic display cell utilizing a conductive substrate of non-stoichiometric or doped tin oxide on glass, which is a product of Corning Glass Company, was used as a faceplate for the display cell. The display cell was constructed in the manner illustrated in FIG. 3, with a silver reference electrode having a film of silver chloride thereon and an aqueous potassium chloride electrolyte. By application of voltages ranging from −1.2 v to +1.0 v of the Ag/AgCl scale to the display electrodes, colors were obtained in the sequence with the stated applied potentials lavender, −1.2 v; blue, −1.0 v; turquoise, −0.8 v; green, −0.3 v; tan, +0.7 v; and red, +1.0 v. Thus, color differentiation of information can be readily obtained by controlling the voltage applied to the display electrodes. The apparent capacitance of the display element has been found to be in the neighborhood of 300 micro farads per square centimeter. In consequence, in this embodiment the resistance of an electrical lead to a display electrode with a switchable area of one square centimeter must be kept below about 300 ohms in order to maintain a color change response time of less than 100 milliseconds. The energy required to switch the display from greed to red is about 0.5 mJ per centimeter squared of active area being switched. This display cell has been successfully operated over a temperature range of 5° C. to 65° C. without apparent change in its operating characteristics. It is expected that the operating temperature of the cell is limited only by the freezing point of the electrolyte as the temperature decreases and by excessive vapor pressure as the temperature is increased.

The use of an counter electrode such as lead is convenient because it operates with a fast, reversible faradic (electron transfer) reaction. For this reason, it can be electrically cycled many times, as in a rechargeable battery without suffering excessive deterioration. A faradic counter electrode can also serve as a reference electrode as has been indicated previously. Another type of counter electrode which operates with a capacitive, rather than a faradic, mechanism is appropriate for display cells that are controlled by means of a separate reference electrode. An example of a capacitive electrode is a porous carbon plate such as those used as electrodes in fuel cells. A porous carbon electrode can be made to carry substantial current densities without a significant change in potential because the true surface area of the electrode is many orders of magnitude greater than the apparent (projected) area due to the extremely high porosity of the material. The capacitive electrode has the advantage that it does not have to introduce a faradic reaction product into the electrolyte.

In some display cell structures, such as those with segmented alpha numeric characters, the electrical leads 40 to the character segments will be located within the view of the observer. The leads 40 in such cases should be made of a highly conductive material and should be of a minimum width consistent with the response time required of the display. The leads 40 should be electrically insulated from the electrolyte solution and from the electrochromic film in the immediate vicinity of the leads. The small width of these leads and their electrical isolation from the film will result in minimal visibility of the leads. In a preferred design, the insulated leads 40 are located under the conductive substrate that form the background electrode segments. These leads then virtually disappear from view when the electrochromic film is deposited on top of the background electrode segment.

Although the display cells have been discussed in terms of having transparent display electrodes and transparent leads to them, it will be understood that the transparent display electrodes are not essential in the display cell configuration 410 of FIG. 4 where the viewing light does not need to pass through the display electrodes in order for the display information to be viewed. Further, transparent display electrodes are not absolutely required even where the viewing light must pass through the electrodes, so long as the display electrodes are sufficiently light transmissive that the information displayed by the display cell is readily intelligible. Further, although the electrolyte has been discussed as being an aqueous potassium chloride solution any other compatible electrolyte may be used. Among such other electrolytes are $Na_2SO_4$ and $NaClO_4$. A lead, lead sulfate reference electrode may be used with a sodium sulfate electrolyte.

An electrochromic display system has been illustrated and described which overcomes many of the problems of the prior art displays. Those skilled in the art will be able to make many modifications to the disclosed illustrative embodiments while still relying on the applicant's contribution to the art. Consequently, the protection afforded this invention is only limited by the appended claims.

I claim:

1. A low power, rapid switching, electrochromic display device comprising:
   housing means including a substantially transparent viewing surface;
   display electrode means disposed within said housing for being viewed through said viewing surface;
   electrochromic material means disposed as a film within said housing over said display electrode means and in conductive relationship thereto, said electrochromic material means including an electrochromic metal-diphthalocyanine complex;
   electrolyte means disposed within said housing in conductive relationship to said electrochromic film;
   counterelectrode means disposed within said housing in electrically conducting relationship to said electrolyte means;
   lead means for connecting said dipslay electrode means and said counterelectrode means to a display control circuit;
   said lead means, said electrochromic material means, said display electrode means, said electrolyte means and said counterelectrode means together comprising a structure exhibiting an apparent capacitance and an apparent resistance, said lead means, said display elecrrode means, said electrolyte means and said counterelectrode means being sufficiently conductive that said apparent resistance of said structure and said apparent capacitance of said structure combine to provide an RC time constant of one second or less.

2. The low power rapid switching electrochromic display device recited in claim 1 wherein said RC time constant is equal to or less than 100 milliseconds.

3. The display device recited in claim 1 wherein:
   said housing means includes a light transmissive portion in optical alighment with said viewing face;
   said display electrode means are light transmissive; and
   said electrolyte means is light transmissive whereby said display can be viewed by transmitted light.

4. The display device recited in claim 1 wherein said display electrode means include:
   character segment means configured and disposed to be selectively activatable to form characters selected from a predetermined set; and
   background segment means configured and disposed to form a background area against which characters formed by said character segment means are to be viewed so that where selected character segment means defining a selected character are in a first optical state and any non-selected character segment means and said background segment means are in a second optical state, said selected character is displayed in the color exhibited in said first optical state against a background of the color exhibited in said second optical state and when said selected character segment means are in said second optical state and the nonselected character segment means and said background segment means are in said first optical state, said selected character is displayed in said color exhibited in said first optical state.

5. The display device recited in claim 1 wherein said electrolyte means comprises an inert porous solid saturated with an aqueous solution of potassium chloride.

6. The electrochromic display device recited in claim 1 further comprising reference electrode means distinct from said counterelectrode means for establishing the potential of said display electrode means in said electrolyte means.

7. The display device recited in claim 6 wherein:
said electrochromic material means comprises a lutetium diphthalocyanine complex;
said electrolyte means comprises an inert porous solid saturated with an aqueous solution of potassium chloride; and
said reference electrode is selected from the group consisting of silver, lead, mercury and silver, lead or mercury having a film of the chloride thereof thereon.

8. The display device recited in claim 1 wherein said electrochromic material means is one which may be controllably placed in at least three different optical states each of which exhibits a different color.

9. The display device recited in claim 8 wherein said electrochromic material means comprises a lutetium diphthalocyanine complex, and said electrolyte means comprises an inert porous solid saturated with an aqueous solution of potassium chloride such that the display device can exhibit the colors lavender, blue, turquoise, green, yellow or tan shades and red, in accordance with the level on the electrochemical scale at which said display electrode means is maintained.

10. The display device recited in claim 1 wherein said electrochromic material means includes a transparent porous binder for preventing deterioration of the display characteristics of said metaldiphthalocyanine complex.

11. A display cell capable of assuming at least three visually distinct optical states comprising,
transparent display electrode means,
said transparent display electrode means comprising a transparent conductor having sheet resistance of less than about 15 ohms per square,
counterelectrode means for establishing a potential difference relative to said display electrode means,
said counterelectrode means comprising highly conductive material,
a film of electrochromic material disposed on said display electrode means,
an electrolyte material interposed between said film on said display electrode means and said counterelectrode means in order to pass ionic current therethrough,
said cell constructed so that the apparent capacitance C of the cell and the resistance R of the respective electrode means and said counterelectrode means exhibit an RC time constant of not more than one second, and
a reference electrode in contact with said electrolyte material to establish a stable electrochemical potential despite the passage of current through said display cell.

12. The display cell recited in claim 11 wherein said display electrode means comprises an array of segment electrodes for defining a character and an array of background electrodes associated with said segment electrodes to further define said character.

13. The display cell recited in claim 11 wherein each of said visually distinct optical states exhibits a different color.

* * * * *